(12) United States Patent
McClain

(10) Patent No.: US 10,946,624 B2
(45) Date of Patent: Mar. 16, 2021

(54) GLASS REPAIR KIT AND METHOD

(71) Applicant: Patrick McClain, Houston, TX (US)

(72) Inventor: Patrick McClain, Houston, TX (US)

( * ) Notice: Subject to any disclaimer, the term of this patent is extended or adjusted under 35 U.S.C. 154(b) by 404 days.

(21) Appl. No.: 15/637,373

(22) Filed: Jun. 29, 2017

(65) Prior Publication Data
US 2019/0001630 A1    Jan. 3, 2019

(51) Int. Cl.
| | | |
|---|---|---|
| *B32B 17/10* | (2006.01) | |
| *B29C 73/16* | (2006.01) | |
| *B29C 73/30* | (2006.01) | |
| *B29C 73/02* | (2006.01) | |
| *B29L 31/30* | (2006.01) | |
| *B29C 35/08* | (2006.01) | |
| *B29C 65/48* | (2006.01) | |
| *B29C 65/52* | (2006.01) | |

(52) U.S. Cl.
CPC ........ *B32B 17/10963* (2013.01); *B29C 73/02* (2013.01); *B29C 73/163* (2013.01); *B29C 73/166* (2013.01); *B29C 73/30* (2013.01); *B29C 65/4825* (2013.01); *B29C 65/525* (2013.01); *B29C 2035/0827* (2013.01); *B29L 2031/3052* (2013.01)

(58) Field of Classification Search
CPC . B32B 17/10963; B29C 73/025; B29C 73/02; B29C 73/24; B29C 65/4845; B29C 65/483; B29C 65/52; B29C 65/524; B29C 65/525; B29C 65/4825; B29C 65/50; B29C 65/5057; B29C 65/76; B29L 2031/3052; A45D 34/04; B65D 75/00; B65D 75/52; B65D 75/26; B65D 75/32; B65D 75/325; B65D 75/326; B65D 75/36; B65D 75/366; A61M 35/003; A61M 35/006; B05C 17/00583
USPC ..... 156/60, 94, 98, 145, 146, 196, 210, 242, 156/245, 247, 249, 272.2, 275.5, 275.7, 156/290, 291, 292, 295, 332, 701, 714, 156/719; 222/92, 105, 107, 541.1, 541.3, 222/541.4, 541.6, 541.9; 206/484, 484.2, 206/461, 467, 469; 220/260, 265, 266, 220/267, 276; 428/63; 425/11, 12, 13; 401/132, 133, 183, 184, 185, 134, 135; 264/36.21, 36.22, 36.1
See application file for complete search history.

(56) References Cited

U.S. PATENT DOCUMENTS

| | | | | |
|---|---|---|---|---|
| 3,386,793 | A | * 6/1968 | Stanton | .................. A47L 23/05 401/132 |
| 3,466,131 | A | * 9/1969 | Arcudi | .................. B65D 83/00 401/132 |

(Continued)

*Primary Examiner* — Philip C Tucker
*Assistant Examiner* — Brian R Slawski
(74) *Attorney, Agent, or Firm* — Thomas Nash

(57) ABSTRACT

A portable glass repair kit system and method, more particularly, for windshield repair for laminated glass and the like to provide an easy to use, highly portable, and economical glass repair kit. The glass repair kit does not require specialized equipment such as an injector, plugger device, suction cups, or require any additional tools or specialized knowledge of how to use the repair kit. The glass repair kit contains a resin which may be urged by a user through slight pressure after the glass repair kit is adhered over an impact point and any cracks thereby repairing a windshield in a more cost effective, time efficient, and user friendly way.

21 Claims, 10 Drawing Sheets

(56) References Cited

U.S. PATENT DOCUMENTS

| | | | | |
|---|---|---|---|---|
| 3,860,348 A * | 1/1975 | Doyle | A47L 25/08 | 401/6 |
| 4,084,910 A * | 4/1978 | LaRosa | A61J 1/00 | 222/92 |
| 4,183,684 A * | 1/1980 | Avery, Jr. | A45D 34/04 | 401/133 |
| 4,475,835 A * | 10/1984 | Verboom et al. | A47L 13/34 | 401/132 |
| 4,899,739 A * | 2/1990 | Konishi | A61F 13/0203 | 604/306 |
| 5,156,853 A * | 10/1992 | Werner | B29C 73/025 | 156/285 |
| 5,372,761 A * | 12/1994 | Anderson, Sr. | B29C 73/025 | 264/36.21 |
| 5,775,826 A * | 7/1998 | Miller | A45D 34/04 | 401/132 |
| 5,957,605 A * | 9/1999 | Cohen et al. | A45D 34/04 | 401/132 |
| 6,051,249 A * | 4/2000 | Samuelsen | A61F 13/0276 | 424/443 |
| 6,475,502 B1 * | 11/2002 | Lee et al. | A61K 9/7015 | 424/405 |
| 2002/0043732 A1 * | 4/2002 | Jacino et al. | B29C 73/02 | 264/36.1 |
| 2006/0113318 A1 * | 6/2006 | May | A45D 34/04 | 222/94 |
| 2011/0245785 A1 * | 10/2011 | Inaba | A61K 9/08 | 604/305 |
| 2012/0003029 A1 * | 1/2012 | Guzman | A61M 35/003 | 401/133 |
| 2012/0055611 A1 * | 3/2012 | Berndt | B32B 17/10963 | 156/94 |
| 2013/0000517 A1 * | 1/2013 | Syfko | B65D 77/0486 | 106/287.14 |
| 2015/0034671 A1 * | 2/2015 | Fitzgerald, IV | B65B 3/045 | 222/107 |
| 2015/0175284 A1 * | 6/2015 | Sharp et al. | B65B 43/02 | 222/92 |
| 2017/0008229 A1 * | 1/2017 | Quinn | B29C 48/02 | |

* cited by examiner

GLASS REPAIR KIT AND METHOD

BACKGROUND OF THE INVENTION

Field of the Invention

The present invention relates generally to portable glass repair kit systems and, more particularly, to a glass repair kit for windshield repair for laminated glass.

Background of the Invention

Vehicle windshields must be resilient enough to withstand constantly being struck with tiny pebbles, sand, gravel, and other such road debris. Therefore, modern vehicles are equipped with laminated glass. Laminated glass is a type of safety glass which does not completely shatter into dangerous shards upon impact. Laminated glass is formed from two or more thin sheets of tempered glass that are fused to a rubber or plastic central layer, typically of polyvinyl butyral (PVB) or ethylene-vinyl acetate (EVA). The outer layers are independent, one on the outside of the vehicle and one on the inside of the vehicle. The central layer acts by absorbing the shock from an impact and reduces the chance of breakage from small particles such as pebbles or the like.

If an object strikes the windshield glass with sufficient force, a chip or crack may be formed. However, the chip is usually localized to only the outer layer of glass. The inside layer of glass within the vehicle is protected from breaking due to the central membrane absorbing the shock of the impact and thereby mitigating further damage to the inside layer of glass. Windshield repair is a viable solution to repair the rock chips that have damaged the outer layer of the glass and prevent further damage, such as cracks spreading from the chip, causing irreparable harm. When done properly, the strength and clarity is sufficiently restored for most safety related purposes.

Prior art glass repair systems are typically complicated involving expensive specialized tools which are not intuitive to operate. These systems advantageously fill cracks or chips in windshields caused from rocks, debris, or other impacts causing damage. Unrepaired damage eventually may permanently damage the windshield as water permeates the layers of glass, causing condensation and decreasing visibility. This may lead to the entire windshield structure being compromised to the point of requiring replacement. Commercial repair kits utilize a special resin which is injected into the center of the chip by first removing moisture, dirt, foreign matter, loose glass, and contamination from the damaged area. The damaged area may then be accessed through probing or drilling to reach the central layer. Resin is then injected using a specialized tool such as a bridge type holding structure having a metal structure with an injector secured to the windshield by suction cups, which offers leveraging and mechanical advantage. The holding structure or bridge holds the injector in place while repairing the damage. The structure controls both pressure on the resin injection and pressure on the glass so that the resin will efficiently fill the crack or chip. After which a vacuum is used to remove air and apply pressure causing the resin to spread and fill the cracks extending from the center of the chip. It is sometimes desirable to be able to quickly repair cracks or chips without the need of visiting a repair center. Repair centers may not be close to a driver's location, open at the time, or may also require a separate visit leading to increased time, effort, and costs.

There exists a need for a glass repair kit that is easy to use for one with little or no skill in repairing windshields, highly portable, and very economical. Consequently, those skilled in the art will appreciate the present invention.

SUMMARY OF THE INVENTION

A primary object of the present invention is to provide an easy to use glass repair kit for users who have little or no skill in window repair, is highly portable, and is economical.

Another object of the present invention is to provide a glass repair kit which does not require specialized equipment such as an injector, plugger device, suction cups, or the like.

Still another object of the present invention is to provide a glass repair kit that does not require any additional tools or training other than instructions of how to use the repair kit.

One general aspect includes a glass repair kit to repair an impact point in safety glass including a housing. The housing includes a top surface and a bottom surface where in operation after placement of the housing on the safety glass then the bottom surface is adjacent to the safety glass and the top surface is distal to the safety glass. The glass repair kit also includes an adhesive operable to adhere the bottom surface to the safety glass. A pocket is formed in the housing. The pocket includes resin stored therein. An adhesive is positioned on the bottom surface entirely around the pocket where when the adhesive is adhered to the safety glass and the bottom surface then a seal is formed between the housing and the safety glass around the pocket. The pocket is compressible where compression of the pocket urges the resin into the impact point in the safety glass during operation of the glass repair kit. The resin is operable to flow into the impact point and cure in response to UV light. The glass repair kit also includes a UV shield for the pocket. The UV shield is operable to block transmission of UV light to the resin within the pocket.

Implementations may include one or more of the following features: the glass repair kit further includes the housing may be bendable to conform to a shape of the safety glass. The adhesive forms a seal around the opening in the housing which connects between the housing and the safety glass. The glass repair kit further includes the UV shield may be adhered to the top surface and may be removable from the top surface of the housing. The UV shield may be flexible, where when the UV shield is removed then the UV light is capable of transmission through the top surface of the housing and into the pocket. A backing may be adhered to the bottom surface of the housing. The backing is operable to block transmission of UV light to the pocket. The backing may be removable from the bottom surface of the housing to expose the adhesive. The adhesive is operable to adhere to the safety glass after removal of the backing from the bottom surface. The glass repair kit further includes the bottom surface may be substantially flat where after the backing is removed from the bottom surface, the adhesive is operable to adhere to the safety glass to form an air tight seal therebetween.

The housing may include double sided tape where the adhesive is coated on the top and bottom surfaces. The adhesive may be operable to adhere a backing to the bottom surface and further operable to secure the bottom surface to the safety glass. A porous material may be configured to be housed within the pocket where the porous material contains the resin within. The pocket may be compressible. The porous material may also be compressible, whereupon compression of the pocket the resin is operable to flow into the impact point of the safety glass. The porous material may include a sponge. The glass repair kit further may rather include a capsule configured to be housed within the pocket where the capsule contains the resin within. The pocket may be compressible where the capsule may also be compressible. Whereupon compression, the capsule is breakable and the resin is operable to flow from the capsule and urged into the impact point of the safety glass.

The glass repair kit further including an opening centrally located in the housing where the opening may be on an opposite side relative to the pocket. The opening may be configured to allow flow of the resin therethrough. The housing may be configured with perforations along an area opposite the pocket with the perforations positioned to correspond relative the opening. The perforations may be configured to open in response to compression of the pocket, where after the perforations are opened the resin is freed to flow through the perforations into the impact point of the safety glass. A backing may be secured to the housing. The backing may be a UV shield. The backing may be removable.

The method may further include providing a backing on the bottom surface of the housing, providing the backing is removable from the bottom surface, and providing that the backing is operable to block transmission of UV light to the resin within the pocket until the backing is removed to commence curing of the resin. Adhering the backing to the bottom surface of the housing may utilize the adhesive. The method further including providing a porous material configured to be housed within the pocket where the porous material contains the resin within. When the pocket is compressed, the porous material is also compressed where the resin is urged into the impact point of the safety glass.

The method further including providing an opening centrally located in the housing. The opening may be on an opposite side relative to the pocket. The opening may be configured to allow flow of the resin from the pocket to the safety glass. Perforations may be provided in the housing along an area opposite the pocket. The perforations positioned to correspond relative the opening. The perforations may be configured to open when the compression of the pocket occurs, where after the perforations may be opened the resin flows through the perforations into the impact point of the safety glass. The glass repair kit further including a means to seal the bottom surface and the safety glass to form a fluid seal around at least the pocket.

One general aspect includes a method of providing a glass repair kit to repair an impact point in safety glass, the method including: providing a housing including a top surface and a bottom surface where in operation after placement of the housing on the safety glass then the bottom surface is adjacent the safety glass and the top surface is distal the safety glass. The method also includes providing adhesive to adhere the bottom surface to the safety glass. A pocket may be provided in the housing. The method may also includes providing that the pocket includes resin stored therein. Adhesive may be positioned entirely around the pocket where when the adhesive is adhered to the safety glass then a seal is formed between the housing and the safety glass around the pocket. The method may also include providing that the pocket is compressible, where compression of the pocket urges the resin into an impact point in the safety glass, providing that the resin is operable of flowing into the impact point and curing by UV light. A UV shield may be provided for the pocket. The method also includes providing that the UV shield may be operable to block transmission of UV light to the resin within the pocket.

Implementations may include one or more of the following features: providing a backing on the bottom surface of the housing. A backing may be provided which is removable from the bottom surface, providing that the backing is operable to block transmission of UV light to the resin within the pocket until the backing is removed to commence curing of the resin. The method further including adhering the backing to the bottom surface of the housing utilizing the adhesive. A porous material may provided and configured to be housed within the pocket where the porous material contains the resin within. When the pocket is compressed, the porous material is also compressed where the resin is urged into the impact point of the safety glass. The method further including providing an opening centrally located in the housing, the opening on an opposite side relative to the pocket. The opening may be configured to allow flow of the resin from the pocket to the safety glass. Perforations may be provided in the housing along an area opposite the pocket. The perforations may be positioned to correspond relative the opening. The perforations may be configured to open when the compression of the pocket occurs, where after the perforations may be opened the resin flows through the perforations into the impact point of the safety glass. The glass repair kit further include a means to seal the bottom surface and the safety glass to form a fluid seal around at least the pocket.

One general aspect includes a glass repair kit to repair an impact point in safety glass, including: a housing, the housing including a top surface and a bottom surface where in operation after placement of the housing on the safety glass then the bottom surface is adjacent the safety glass and the top surface is distal the safety glass. The glass repair kit may also include a means to secure the bottom surface to the safety glass. A pocket may be formed in the housing. The pocket includes resin stored therein. The means to secure may be positioned on the bottom surface entirely around the pocket to secure the bottom surface to the safety glass. The pocket may be compressible, where compression of the pocket urges the resin into the impact point in the safety glass during operation of the glass repair kit. The resin may be operable to flow into the impact point and cure in response to UV light. The glass repair kit may also include a UV shield for the pocket. The UV shield may be operable to block transmission of UV light to the resin within the pocket. The glass repair kit further including a means to seal the bottom surface and the safety glass to form a fluid seal around at least the pocket.

These and other objects, features, and advantages of the present invention will become clear from the figures and description given hereinafter. It is understood that the objects listed above are not all inclusive and are only intended to aid in understanding the present invention, not to limit the bounds of the present invention in any way.

Figure 1:
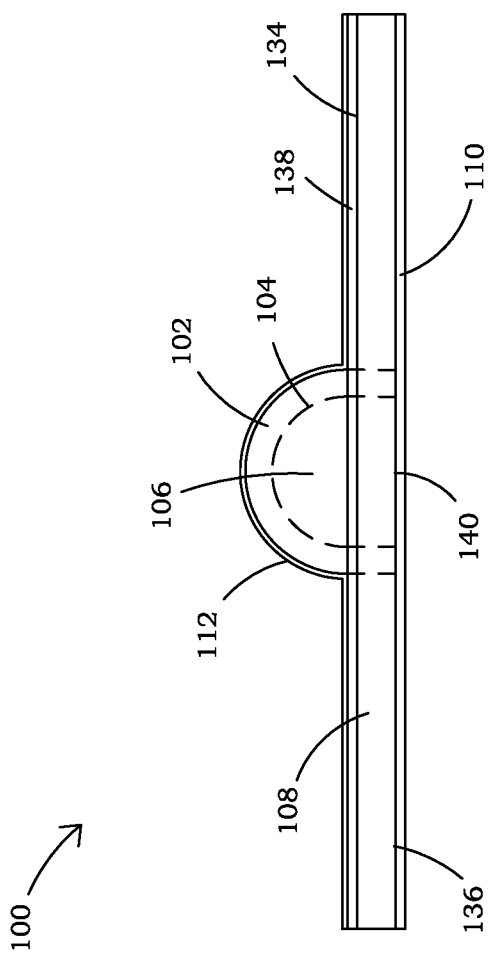
FIG. 1 is a side view showing a glass repair kit in accord with one possible embodiment of the present invention.

The above general description and the following detailed description are merely illustrative of the generic invention, and additional modes, advantages, and particulars of this invention will be readily suggested to those skilled in the art without departing from the spirit and scope of the invention. A more complete understanding of the invention and many of the attendant advantages thereto will be readily appreciated by reference to the following detailed description when considered in conjunction with the accompanying drawings, wherein like reference numerals refer to like parts.

DETAILED DESCRIPTION OF THE PREFERRED EMBODIMENT

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Referring now to the drawings and more specifically to FIG. 1, is a side view showing a glass repair kit in accord with one possible embodiment of the present invention. Glass repair kit 100 comprises a housing 108 providing sufficient rigidity and a structure for glass repair kit 100 although the housing and/or components thereof may be bendable as necessary for any curves in a windshield. Housing 108 is generally square shaped, however other shapes may be used such as circular, rectangular, or the like depending on the application and shape of the damage to a vehicle's windshield. In a preferred embodiment, housing 108 is formed of a thin, flexible foam. Any other suitable material may be used such as other plastics, foam, rubber, double sided tape, or the like that is still able to remain rigid enough to support the housing from becoming overly flexible or loose and maintain a substantially flat configuration. Housing 108 could be thicker so that pocket 102 does not extend therefrom.

In this embodiment, housing 108 comprises a top surface 134 and a bottom surface 136. Housing 108 is configured with a central portion capable of retaining porous material 104. Centered within housing 108 is an opening 140 which may be generally circular or other suitable shape depending on the application. The opening could also be configured with perforations or the like that are broken during operation to allow the resin to flow into the glass as discussed herein. The resin is UV (ultraviolet) sensitive so that it begins to harden after being exposed to UV light. UV sensitive resin is readily available and has been used in the prior art for years to fix windshields. In one possible embodiment, adhered to the top surface 134 is a film 138. Film 138 may be vacuum sealed onto housing 108 over porous material 104 thereby creating a pocket 102 retaining porous material 104 within the housing 108. A flexible dome or hemisphere may be created forming the pocket 102 when the film 138 is vacuum sealed to the housing 108. A mold or other means of forming pocket 102 may also be used. Both the film and porous material may therefore be flexible. Pocket 102 may be comprised of flexible, compressible material. Pressing on the pocket 102, which may be a dome shape and created by the flexible film, may then be used to urge or inject the resin into the windshield 124. In one possible embodiment, film 138 may be configured to act as UV shield 112 and therefore a separate UV shield may be omitted. Therefore, film 138 may be opaque and act as a UV shield to block UV light from entering into pocket 102. In another possible embodiment, film 138 may be transparent or translucent and configured to allow UV light to penetrate into a pocket 102, therefore would require a separate UV shield placed over film 138 to block UV light.

In one possible embodiment in which film 138 acts as UV shield 112, film 138 may be permanently adhered to top surface 134. UV light would be blocked from interacting with resin 106 until removal of glass repair kit 100. This would allow resin 106 to flow freely throughout an impact point and cracks to prevent resin 106 from curing prematurely. To completely fill the damaged area may take approximately 5-10 minutes. Once the damaged area has been completely filled in with resin, glass repair patch or kit 100 may be removed. Upon interaction with UV light, resin 106 may cure relatively quickly, for example in 5-10 minutes, making it important to prevent light from penetrating through UV shield 112.

In another possible embodiment, film 138 may be transparent to be configured to allow transmission of UV light into said pocket 102 after removal of a UV shield 112, which is positioned over film 138. In this embodiment, a removable UV shield 112 covers the entire housing. Removable UV shield 112 may be adhered above film 138 and entirely shields pocket 102 from transmission of ultraviolet (UV) light. UV shield 112 may be flexible and removable by peeling apart relative top surface 134 of housing 108.

In another embodiment, the housing may be retained in a UV shielded package, sack, or the like that blocks UV light prior to and during usage so that the housing 108 or pocket 102 does not require a separate removable UV shield mounted to the housing. In another embodiment, removable UV shield 112 may be placed over the pocket 102 only rather than the entire housing 108.

In a preferred embodiment, porous material 104 may be for example a sponge which is placed in the opening 140 of housing 108 whereby when film 138 is vacuum sealed on the top surface 134 of the housing a pocket 102 is formed. Film 138 may be adhered to top surface 134 sealing porous material 104 within housing 108. In another embodiment, porous material 104 may be a sponge, breakable capsule, or other like permeable device operable to retain resin 106 and urge resin during compression. As discussed herein when flexible pocket 102 is compressed then the resin 106 is forced into the impact point 118 or cracks 120 of the glass. In other words, when flexible pocket 102 is compressed, porous material 104 is compressed secreting resin 106 which may be urged or injected through opening 140 into impact point 118 (See FIG. 6) of glass surface 124, which may also be referred to as a windshield or safety glass. In another possible embodiment, a capsule is configured to be housed within pocket 102 wherein the capsule contains resin 106 within. When pocket 102 is compressed, the capsule is also compressed breaking the capsule open whereby resin 106 is urged or injected through opening 140 into impact point 118 of windshield or glass surface 124. In a preferred embodiment, flexible pocket 102 may protrude generally upward relative to top surface 134 and is sufficiently sized to contain adequate porous material 104 within.

In another embodiment, pocket 102 may remain flush with top surface 134 and be flexible or otherwise compressible to allow compression of pocket 102. For example, pocket 102 could be a cylinder and the top of the pocket, which might be a rigid disk, could act as a piston to compress resin into an impact point. In this embodiment, resin may be stored with or without a permeable material or may simply be placed in the cylinder and may or may not comprise any additional non-porous container such as a capsule. Pocket 102 may also be referred to as flexible pocket or compressible pocket 102.

Figure 9:
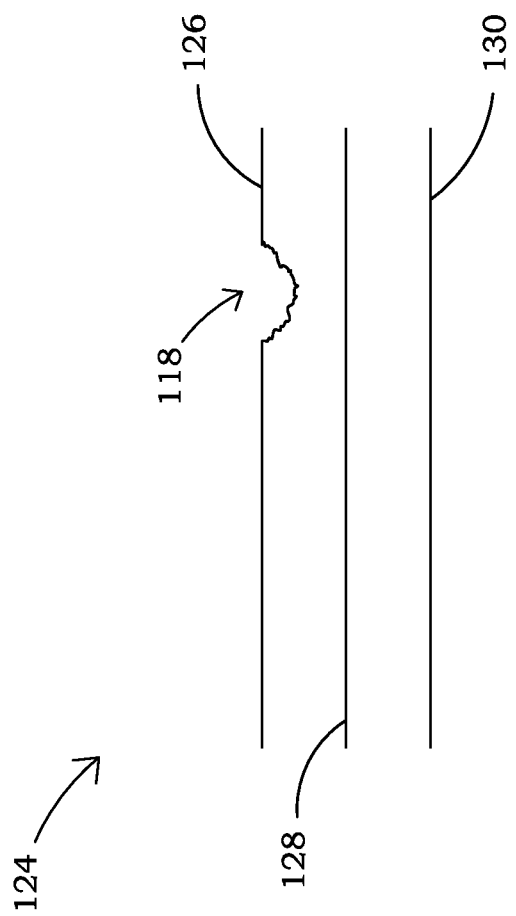
FIG. 9 is a side cross-sectional view showing an impact point of a windshield damaging the outer layer of glass while the inner layer of glass is undamaged in accord with one possible embodiment of the present invention.
Figure 10:
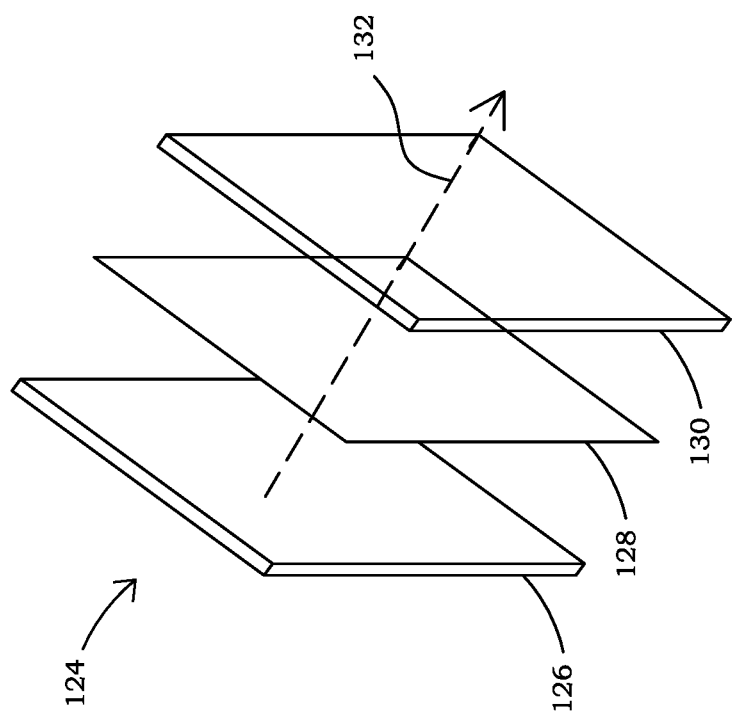
FIG. 10 is an exploded perspective view showing the various layers of laminated windshield glass with light passing therethrough in accord with one possible embodiment of the present invention.

In the embodiment shown in FIG. 1, porous material 104 contains resin 106, which is used to repair the outer layer 126 of safety glass (See FIGS. 9 and 10). Porous material 104 provides the benefit of retaining resin 106 inside thereby mitigating inadvertent leaks or spilling when backing 110 is removed. Resin 106 is of a type that has been used in the industry for years to repair windshields.

In one embodiment, backing 110 may be adhered to bottom surface 136 and seals opening 140 and pocket 102 from being introduced to outside air as well as stopping resin 106 from desiccation prior to use of glass repair kit 100. Adhesive for backing 110 may be sticky but allow removal of backing 110 as discussed below wherein the same adhesive can then be used to adhere housing 108 to the windshield. However, if desired other arrangements such as separate adhesive could be used. Backing 110 may also be secured to bottom surface 136 without adhesives such as by sliding on, snapping on, or the like. Backing 110 is operable to block transmission of UV light from penetrating through opening 140 and into pocket 102. Backing 110 may be flexible and removable by peeling apart from housing 108. In another embodiment, backing 110 may be perforated in an area relative to opening 140. Upon applied pressure to pocket 102, the perforations would break allowing resin 106 to be released through opening 140.

An exemplary embodiment may be comprised of housing 108 formed from high bond double sided acrylic foam tape with an opening 140 created in the center. A porous material 104, such as a sponge, may be inserted into the opening 140. The porous material retains resin 106 within. A film 138 may be vacuumed formed onto top surface 134 and adhered due to an adhesive on both the top and bottom of the housing 108. As film 138 is vacuum formed, a pocket 102 is formed over porous material 104. A backing 110 may be placed on the bottom surface 136 and adhered due to adhesive 114. In this embodiment, the housing remains flexible, lightweight, and relatively thin. Additionally, the adhesive on the bottom surface can be used to both secure backing 110 to the housing and prevent interaction with other surfaces prior to use, as well as, in operation securing glass repair kit 100 to the windshield.

Figure 2:
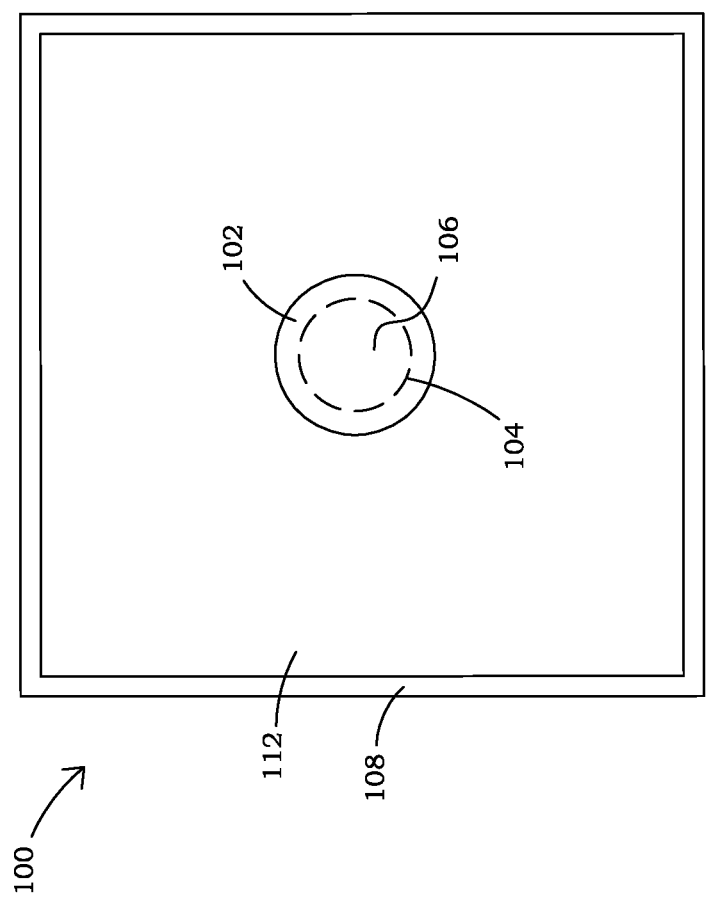
FIG. 2 is a top view showing a glass repair kit in accord with one possible embodiment of the present invention.

Referring to FIG. 2, a top view is shown of glass repair kit 100 in accord with one possible embodiment of the present invention. Glass repair kit 100 comprises UV shield 112 adhered to top surface 134 and may be opaque thereby increasing its ability to block the transmission of UV light into pocket 102. As shown in FIG. 2, pocket 102 may be substantially circular and centered relative to housing 108. UV shield 112 may completely cover pocket 102 increasing its ability to stop UV light from entering pocket 102 and interacting with resin 106 within porous material 104.

Referring also to FIG. 1, in another possible embodiment, film 138 is adhered to top surface 134 with a separate UV shield 112 placed over film 138. Film 138 may be transparent with an opaque UV shield adhered above. Upon removal of UV shield 112 or removal of the glass repair kit 100, UV light would then be able to interact with resin 106 to cure.

Figure 3:
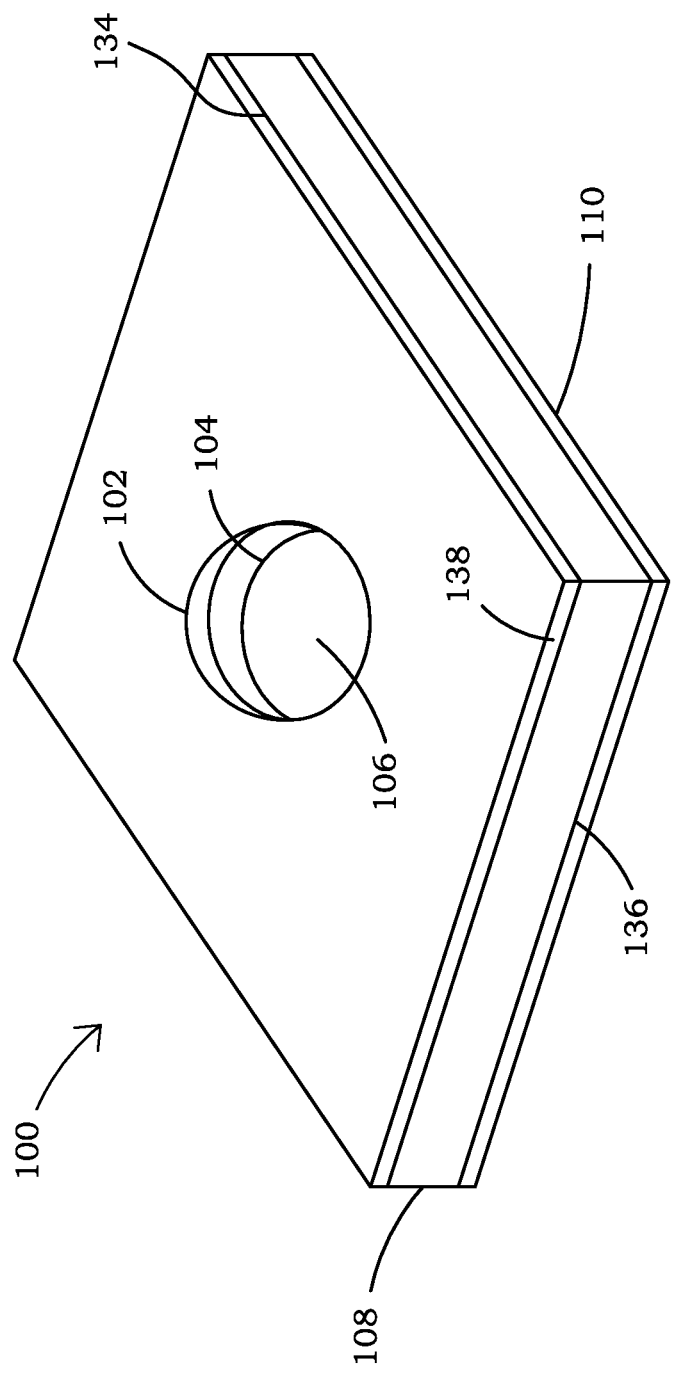
FIG. 3 is a perspective view showing a glass repair kit in accord with one possible embodiment of the present invention.

Referring to FIG. 3, a perspective view is shown of glass repair kit 100 in accord with one possible embodiment of the present invention. In this embodiment, UV shield 112 has been removed revealing film 138 and top surface 134 of housing 108. In this embodiment, film 138 may be transparent or opaque with a flexible pocket 102 which can be seen protruding upward relative housing 108 in a substantially dome or hemispherical shape. Other shapes of flexible pocket 102 can be used depending on the application, shape of opening 140, shape of porous material 104, or the like. Porous material 104, which contains resin 106, may be housed within pocket 102. Film 138 may be configured to be utilized as a UV shield wherein it may be opaque or other color operable to completely shield any light from prematurely curing resin 106, whereupon a separate shield 112 is not necessary.

In one embodiment, film 138 is preferably opaque and adhered to top surface 134. Film 138 may configured to not be removable, such that no incidental exposure of light may penetrate pocket 102. UV light reacts with resin 106 allowing resin 106 to harden after the resin flows through opening 140 and into impact point 118 and to the cracks 120 in the windshield. Resin 106 hardens generally quickly after exposure to UV light, such as in a few minutes.

In another embodiment, a separate UV shield 112 may be opaque and above film 138 which may be transparent. UV shield 112 may remain secured to housing 108 while resin 106 may flow into the damaged area. Upon resin 106 completely filling surface pits 118 and cracks 120, then UV shield 112 may be removed. Upon removal of UV shield 112, pocket 102 may be transparent to allow UV light to penetrate to porous material 104 and resin 106.

In another embodiment, a UV shield is used somewhere in housing 108 above pocket 102 and the entire housing 108 is removed in order to expose the resin to UV light.

Backing 110 may be adhered to bottom surface 136 by an adhesive 114. Adhesive 114 may be of a type that is very sticky and forms a seal between the housing and the windshield as discussed hereinafter but may remain soft and relatively removable during clean up. Adhesive 114 may be used to adhere backing 110 to bottom surface 136. Adhesive 114 may also be used to adhere bottom surface 136 to windshield 124 after removal of backing 110. Adhesive 114 may be of the type that does not set or harden, but rather remains pliable and sticky or viscid to secure glass repair kit 100 to a windshield during use but may remain pliable enough to be removed by a user without leaving residue on the windshield after removal of the glass repair kit. Leftover residue may impede a driver's view, therefore having an adhesive that does not leave residue upon removal decreases additional time and work while using glass repair kit 100. Also, it is advantageous to be able to use the same adhesive to secure backing 110 to the housing and also to use the same adhesive to secure the housing to the windshield. However, in other embodiments, adhesive may be applied separately or not at all. In some embodiments, glass repair kit 100 may be secured to the windshield by other means such as suction cups or the like. Other means may also be used to secure glass repair kit 100 to windshield 124 such as sealants, elastomeric seals, synthetic chemicals, cement, paste, glue, tape, epoxies, or the like. Such means to secure glass repair kit 100 to the windshield may also provide a means to provide a seal (for example see FIGS. 7 and 8) between bottom surface 136 and windshield 124 to prevent air from interacting with resin 106 creating bubbles or impeding flow as well as to prevent resin 106 from curing prior to completely filling the impact point and associated cracks.

Backing 110 comprises a material operable to block UV light penetration through opening 140 and into pocket 102. Backing 110 may be flexible and peeled off just prior to applying glass repair kit 100 to windshield or glass surface 124. Utilizing backing 110 as a means to retain adhesive 114 makes the kit easier to use without the need to separately apply adhesive.

Figure 4:
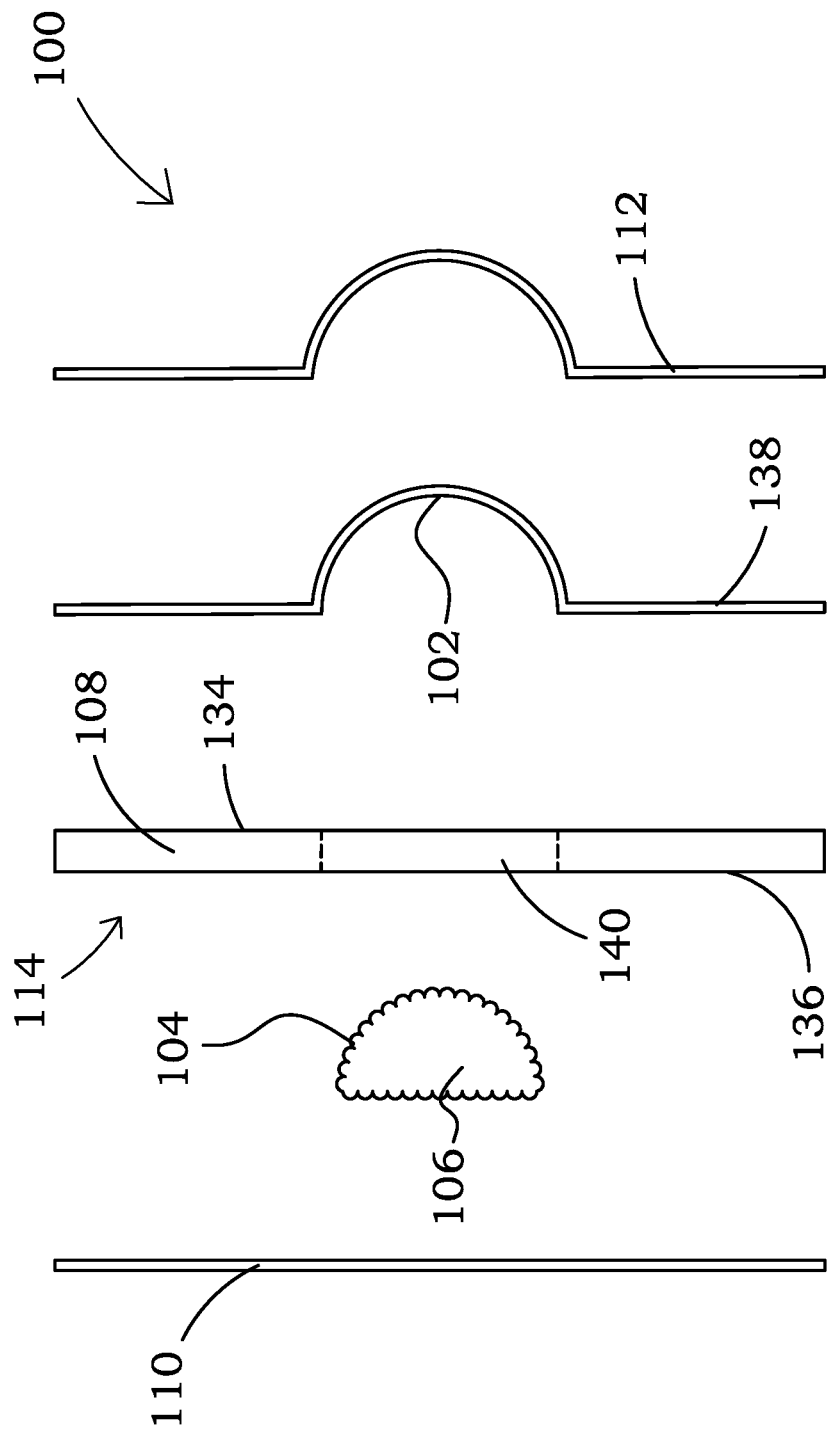
FIG. 4 is an exploded view showing a glass repair kit in accord with one possible embodiment of the present invention.

Referring to FIG. 4, an exploded view is shown of glass repair kit 100 in accord with one possible embodiment of the present invention. In one possible embodiment, glass repair kit 100 may comprise a backing 110. Backing 110 may be flexible plastic, rubber, or like material that is operable to block the transmission of UV light. Backing 110 may be adhered to bottom surface 136 of housing 108. Backing 110 may be removed from bottom surface 136 by peeling off or other like removal processes. During normal operation, removal of backing 110 generally may not expose bottom surface 136 and generally the contents within pocket 102 to sufficient UV light for activation of resin 106. Upon removal of glass repair kit 100 from the windshield, then sufficient UV light is allowed to cure the resin. In another possible embodiment, a separate UV shield 112 may be removed after placement of the kit 100 onto the window and complete saturation of resin 106 into the damaged area. The UV sensitive resin 106 is activated to harden once it receives UV light. The process from placing glass repair kit 100 and hardening may be complete after about 5 to 15 minutes.

As discussed previously, glass repair kit 100 may further comprise a porous material 104 within pocket 102. Porous material 104 may be a sponge, but may also be any other permeable material capable of retaining resin 106 within. In another possible embodiment, a capsule retaining resin 106 may be utilized wherein applied pressure is capable of breaking the capsule. Upon the capsule breaking, resin 106 may be released to flow. In one embodiment, the porous material and/or sponge may be selected to permit UV light flow therethrough once a removable UV shield is removed.

Housing 108 comprises a top surface 134 and a bottom surface 136. Housing 108 may be formed of a thermoplastic material utilizing a mold, however, other like materials such as other plastics, rubber, or the like that could be flexible yet sufficiently rigid to maintain support for the housing 108 from becoming overly flexible or loose and to maintain a substantially flat configuration. In one embodiment, bottom surface 136 may be coated with an adhesive 114 operable to adhere bottom surface 136 to windshield 124. While it would be possible to apply adhesive separately, in this embodiment, adhesive 114 is already in place on bottom surface 136 underneath backing 110. In one embodiment, bottom surface 136 may be substantially flat or slightly bendable to conform to the windshield. In another embodiment, bottom surface 136 may be curved or have other shapes that are still sufficiently operable to conform to the curvature of windshield 124. Centered in housing 108 and bottom surface 136 may be opening 140. In another possible embodiment, opening 140 may be comprised of a perforated material configured to open with the application of downward pressure. As shown in FIG. 4, opening 140 may be substantially circular, however any other shape may be used such as square, rectangular, or the like. In yet another embodiment, another compressible device may be utilized or formed within pocket 102 to inject or urge the resin.

During manufacture, porous material 104 may be inserted through opening 140 into pocket 102. Pocket 102 is sufficiently sized to retain porous material within housing 108. As shown in FIG. 4, pocket 102 may be generally cylindrical extending from opening 140 and extending upward to form generally a hemispherical or dome shape, however other shapes may be used. Backing 110 may seal porous material 104 within pocket 102. Pocket 102 comprises an air tight seal so as to maintain resin 106 within from premature desiccation. In a preferred embodiment, pocket 102 protrudes relative top surface 134 thus allowing a user 122 to easily locate the proper area in which to apply pressure. In another possible embodiment, pocket 102 may be entirely contained within housing 108 and be level relative top surface 134. Pocket 102 may also be recessed relative to housing 108.

Figure 5:
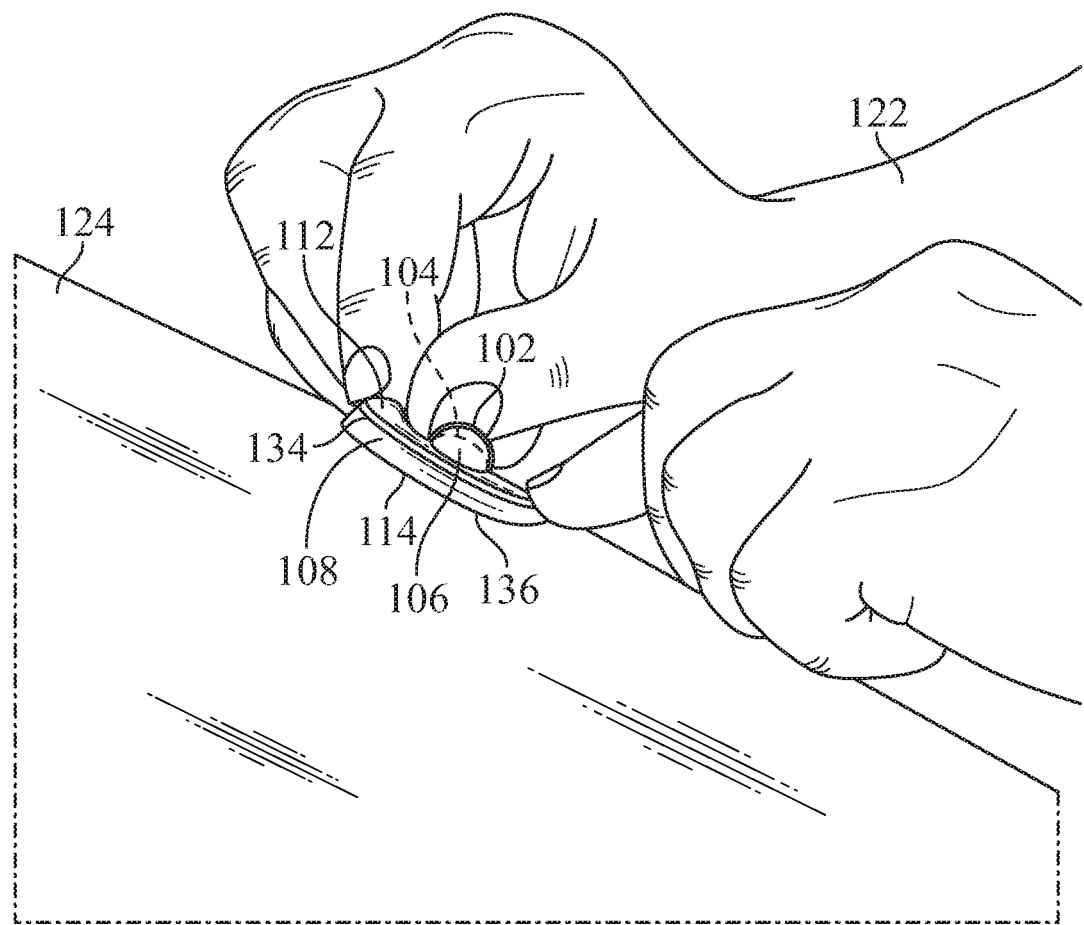
FIG. 5 is a perspective view showing a user placing a glass repair kit onto a damaged windshield in accord with one possible embodiment of the present invention.

Referring to FIG. 5, a perspective view is shown of user 122 placing glass repair kit 100 onto a damaged windshield in accord with one possible embodiment of the present invention. After preparing/cleaning the windshield or glass surface 124 by removing any excess glass or debris, user 122 may place glass repair kit 100 with pocket 102 directly over impact point or surface pit 118. In one possible embodiment, user 122 then removes or peels backing 110 from bottom surface 136 of housing 108. Bottom surface 136 comprises an adhesive 114 that may sufficiently adhere glass repair kit 100 to windshield 124. Adhesive 114 is operable to provide an air tight seal around impact point 118 and any cracks or legs 120. Adhesive 114 preferably forms a fluid tight seal around opening 140 so that all resin is forced into the cracks of the window when preferably flexible pocket 102 is compressed. User 122 need merely provide a slight downward pressure relative to windshield 124 along the entire periphery of glass repair kit 100. By creating an air tight seal, a vacuum is formed allowing resin 106 to flow from porous material 104 into impact point 118 and spread through any cracks 120 (See FIGS. 6 and 7) that may be present. In other words, higher pressure from the pocket forces the resin into any cracks or legs in the glass. In this embodiment, no additional tools or apparatus are necessary to place, align, orient, adhere, nor to create a vacuum relative to glass repair kit 100 and windshield 124.

Figure 6:
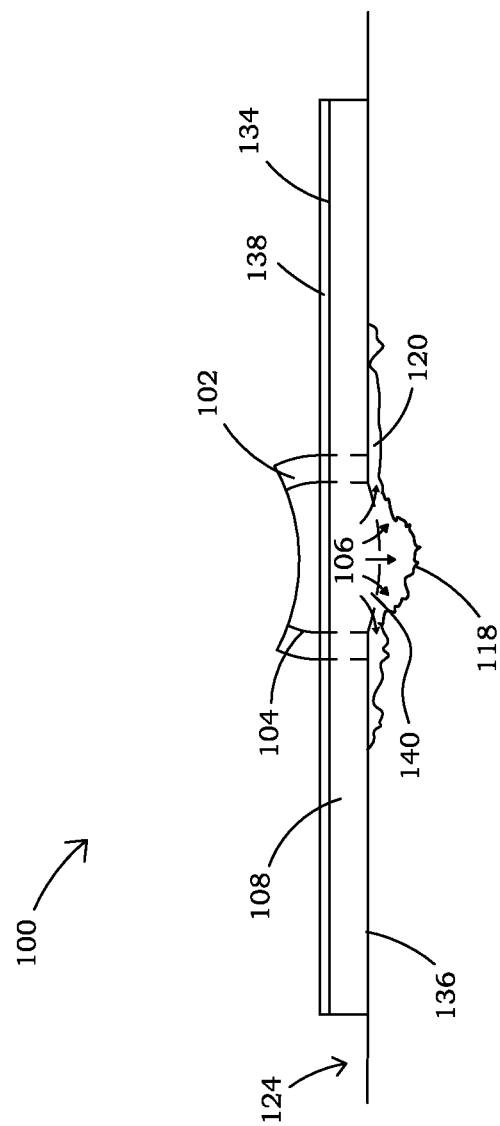
FIG. 6 is a side view showing a glass repair kit in which the pocket has been depressed to apply pressure on the porous material thereby releasing the resin into the damaged windshield in accord with one possible embodiment of the present invention.
Figure 7:
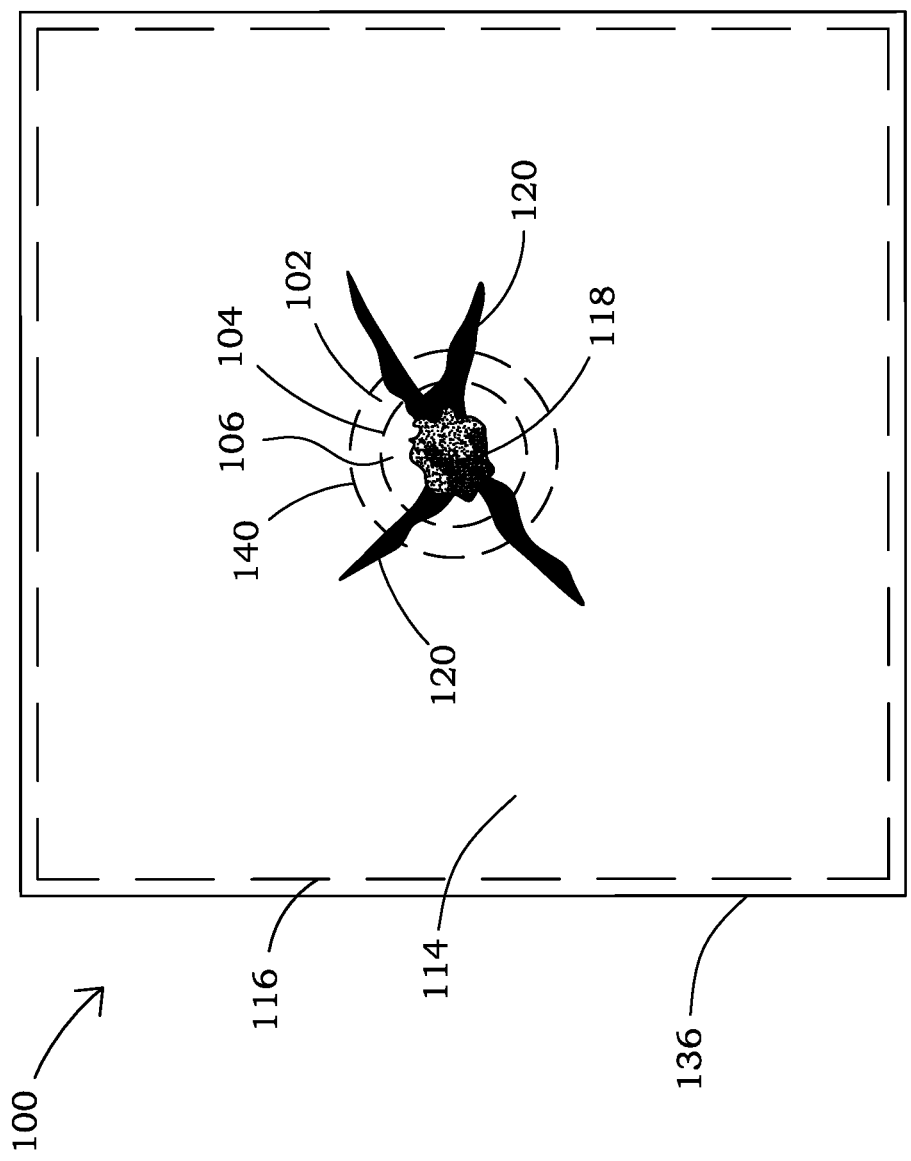
FIG. 7 is a bottom view showing a glass repair kit adhesively sealed and oriented above an impact point with cracks in a windshield in which the pocket has been depressed to apply pressure on the porous material thereby releasing the resin into the damaged windshield in accord with one possible embodiment of the present invention.

Opening 140 may be placed directly over impact point 118 so as to also align porous material 104 to be above the impact point 118 (See FIGS. 6 and 7). The remaining portion of bottom surface 136 may also be positioned or aligned to cover any cracks or legs 120 which emanate from impact point 118. Glass repair kit 100 is preferably sized to cover a damaged area of a windshield approximately 1.75" or less, however larger sized glass repair kits may be used. For example, the glass repair kit 100 or housing 108 may be from one to two inches in size, or may be from one to four inches in size, or may be from one to five inches in size, but may be larger or smaller.

UV light is required to cure resin 106, therefore UV shield 112 may be removed to allow UV light to penetrate into pocket 102 and interact with resin 106. UV shield 112 may be a thin, flexible plastic or other such material thereby allowing removal from housing 108. UV shield 112 may be removed by peeling from top surface 134 of housing 108. In an embodiment with a removable UV shield, UV shield 112 may be removed after resin 106 has had sufficient time to flow throughout the impact point and cracks. In another embodiment, UV shield is not removable, but rather bonded to housing 108. The entire apparatus may be removed after the resin has filled in the damaged area in order to allow UV light to be transmitted to 106 resin to cure.

Referring to FIG. 6, a side view is shown of glass repair kit 100 in which the pocket 102 has been depressed to apply pressure on porous material 104 thereby releasing the resin 106 into the impact point 118 of a damaged windshield 124 in accord with one possible embodiment of the present invention. For this reason, pocket 102 has a generally concave or collapsed top after compression. The user may compress pocket 102 using their thumb or other fingers.

Housing 108 may be adhered to windshield 124 by adhesive 114 (see, for example, FIG. 4 or 5) which may be coated to bottom surface 136. Other means of securing housing 108 to windshield may also be used as discussed previously. Housing 108 may be flexible and operable to conform to the curvature of windshield 124. Adhesive 114 may be adhered to windshield 124 through slight pressure applied by a user 122 around the periphery of housing 108 whereby the adhesive is sufficient to seal off any air from entering into the impact point 118 or any crack 120 which emanates therefrom. This is highly beneficial and eliminates the need for additional tooling typically required in commercial repair centers. The user will preferably press housing 108 from the top all around pocket 102 to make sure that adhesive 114 seals completely around pocket 102 and opening 140.

Once a seal is formed around pocket 102 and opening 140, and preferably over the entire bottom surface 136 of housing 108, with adhesive 114, a user 122 may apply pressure to compress pocket 102 whereby porous material 104 is also compressed. Due to the seal which prevents resin from flowing elsewhere, the resin 106 contained within porous material 104 will then flow through opening 140 and into impact point 118. A relative vacuum, or flow from higher pressure to lower pressure, created by the air tight seal from adhering glass repair kit 100 to windshield 124 further allows resin 106 to flow freely through any remaining cracks or legs 120. When compared to a typical commercial repair center that requires additional heavy tooling, a decreased amount of pressure is required to be applied to windshield 124 thereby mitigating any further damage or cracking from occurring. Greater pressure is often required when utilizing commercial tools and creates a risk of a crack "running" which increases damage, time, and costs associated with repairing a windshield.

As discussed herein, in one possible embodiment, UV shield 112 may be removed from top surface 134, preferably after housing 108 is adhered to windshield 124 and the resin has flowed into the damaged area. Removable UV shield 112 may be a thin, flexible material such as plastic or rubber which may be adhered to top surface 134. UV shield 112 may be peeled off or other like means to be removed from top surface 134 thereby exposing pocket 102 to UV light.

UV light is transmitted into pocket 102, through opening 140, and reacts with resin 106 to begin the curing process. Resin 106 may typically cure within approximately 5 to 10 minutes, but may require more or less time as the size of the impact point and cracks are increased or decreased.

In another embodiment, UV shield 112 not be removable but rather may be bonded to top surface 134 of the housing. After user 122 has compressed pocket 102, resin 106 will be urged into the impact point and cracks due to the compression and pressure differential of the vacuum created by the seal 116 from the adhesive 114 between bottom surface 136 and windshield 124. After allowing the resin 106 to flow, user 122 may remove glass repair kit 100 as described below.

In one embodiment, after sufficient time has passed to allow resin 106 to flow, a user 122 may remove glass repair kit 100 by peeling, scraping, or other like means from windshield 124. User 122 may then visually inspect the repair to determine that the impact point and cracks have been sufficiently repaired. A user 122 may also physically inspect the repair such as by carefully running their finger over, using a scraper or flat edge, or other like means to ensure an acceptable repair. In one embodiment, glass repair kit may include a receptacle containing additional resin, scraper, and transparent film such as tape. In the event user 122 determines a repair is not sufficient, such as cracks remain visible or the resin is not even relative to the outer layer 126 of the glass, user 122 may utilize the receptacle to place additional resin. Typically only one drop of resin is necessary, but may be more, for the area that has been determined to be insufficient. After which, clear film or tape may be placed over the area to create an air tight seal and allow the additional resin to flow into the cracks. UV light may then react with the additional resin to cure. Curing time may typically range from a few seconds to 5-10 minutes, but more time may be necessary depending on the size of the remaining damage area. After sufficient time has passed, user 122 may then remove the clear film by peeling and/or utilizing a scraper to remove any leftover adhesive or excess resin to create a smooth surface relative outer layer 126.

Referring to FIG. 7, a bottom view is shown of glass repair kit 100 adhesively adhered and oriented above an impact point 118 with cracks 120 in a windshield 124 creating an air tight seal 116 in which the pocket 102 has been depressed in accord with one possible embodiment of the present invention. At a minimum, the air tight seal 116 surrounds opening 140. This is done to apply pressure on the porous material 104 thereby releasing the resin 106 into the damaged windshield. One possible type of damage is shown comprising an impact point with cracks emanating therefrom in a "star shape." Glass repair kit 100 may comprise an opening 140 which may be oriented and aligned respectively above impact point 118 and cracks 120. In one embodiment, backing 110 may be removable and peeled away from bottom surface 136. Bottom surface 136 may be coated with an adhesive 114 completely surrounding opening 140 wherein applied pressure may fluidly seal pocket 102 from premature desiccation. In one embodiment, glass repair kit 100 may comprise a removable UV shield 112 adhered to top surface 134. UV shield 112 may be removed by peeling away or other like mechanism from top surface 134. Removal of backing 110 and UV shield 112 allows UV light to be transmitted within pocket 102 and interact with resin 106. In one embodiment, a user need only apply a relatively slight pressure, such as with their thumb or palm, to pocket 102 and porous material 104 to secrete resin 106 into impact point 118 and cracks or legs 120. The air tight seal 116 created by adhesive 114 between housing 108 and windshield 124 results in a pressure differential as the user presses on pocket 102 that causes resin 106 to flow through opening 140 into impact point 118 and spread into any cracks 120 radiating therefrom.

Figure 8:
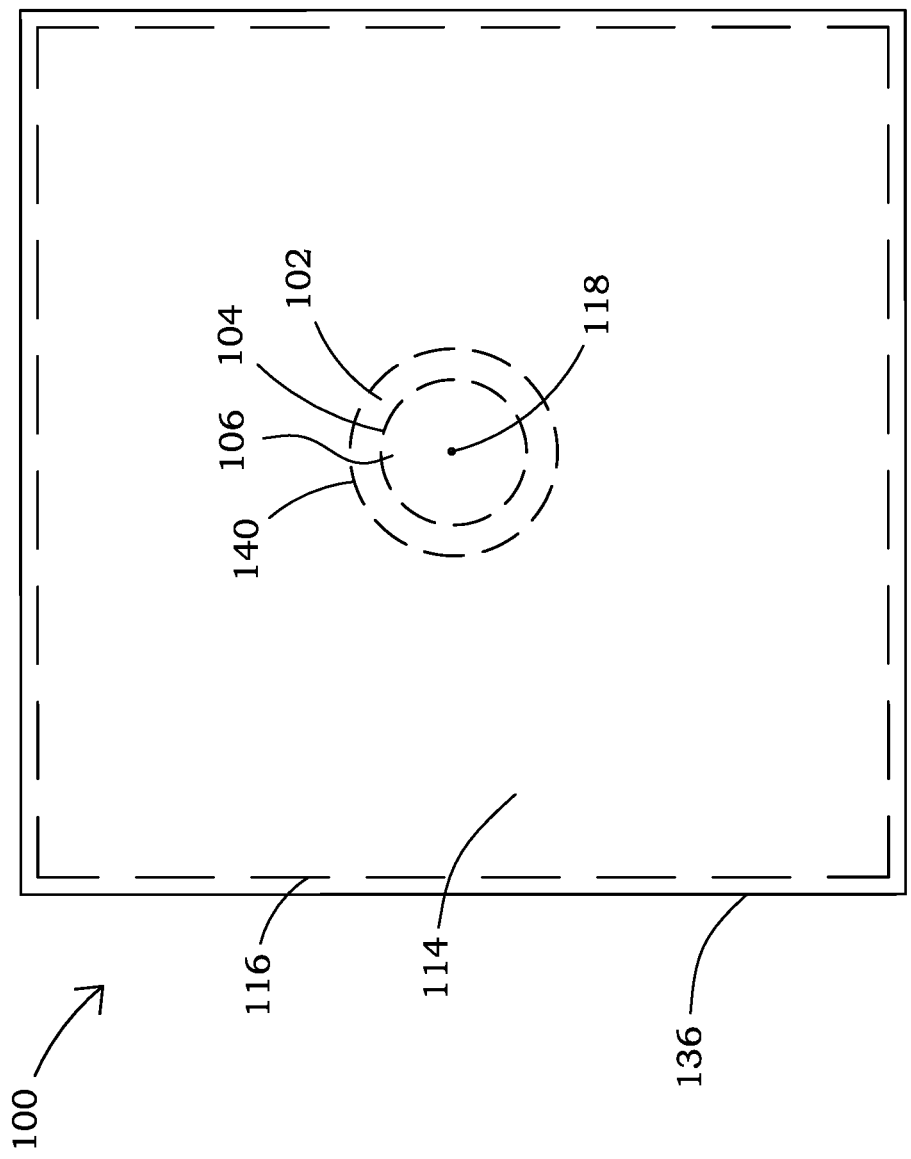
FIG. 8 is a bottom view showing a glass repair kit adhesively sealed and oriented above an impact point with cracks in a windshield in which the resin has had adequate time to cure and fully repair the damage in accord with one possible embodiment of the present invention.

Referring to FIG. 8, a bottom view is shown of glass repair kit 100 adhesively adhered and oriented above an impact point 118 with cracks 120 in a windshield 124 with an air tight seal 116 in which the resin 106 has had adequate time to cure and fully repair the damage in accord with one possible embodiment of the present invention. It will be seen that the resin has filled impact point 118 and cracks 120 so that they may appear invisible.

After a user has depressed pocket 102 thereby injecting resin 106 into impact point 118, resin 106 flows outward to fill cracks 120. UV light interacts with resin 106 after the resin has flowed to repair the damage in windshield 124. In one possible embodiment, the duration of the curing process may be approximately 5-10 minutes, but may be longer depending on the size and severity of any damage. Larger and deeper impact points 118 and longer, wider cracks 120 may accordingly require increased time to properly saturate and fill the damaged areas. As is shown in FIG. 8, where the cracks are no longer visible and the impact point appears much smaller, the required time has elapsed for resin 106 to completely fill the damaged area and cure. Resin 106 may comprise an organic material that approximates the refractive index of the laminated glass and, when cured, will seal the break or crack. The integrity of windshield 124 is restored thereby diminishing any further damage resulting from stresses placed on the windshield during vehicular use. Additionally, clarity through the repair portion has been restored allowing a driver to view through the repair without impediment. In some circumstances, after a repair is complete a remnant of damage may remain that is still visible after the repair is completed creating a cosmetic blemish.

As discussed above, an inspection of the area is recommended to determine if the repair is satisfactory. A visual and tactile inspection may be necessary to determine that resin 106 has cured level with outer layer 126 of windshield 124. If the repair is not level and resin protrudes from the windshield, a scraper may be used to remove excess resin and adhesive from the repaired area. If the repair has not fully filled in the damaged area leaving a depression or nick in the windshield, additional resin may be injected with a transparent film or tape placed over the affected area. UV light may cure the resin will additional time. Upon completion of the curing process, an additional inspection may be made to determine if the repair is satisfactory.

Referring to FIG. 9, a side cross-sectional view is shown of an impact point of a windshield 124 damaging the outer layer 126 of glass while the inner layer 130 of glass is undamaged in accord with one possible embodiment of the present invention. Modern consumer vehicles are equipped with safety glass windshields which do not shatter upon impact with various debris that come into contact with the glass. This type of glass protects driver's from minor injuries as well as more serious injuries that could occur from glass being catapulted in the direction of the driver resulting in bodily harm or losing control of a vehicle thereby causing a collision or wreck.

As shown in FIGS. 9 and 10, one possible embodiment of windshield 124 may comprise three layers of glass: an outer layer 126, a central layer 128, and an inner layer 130. Outer layer 126 is distal inner layer 130 and is exposed to the elements. Any object that impacts windshield 124 will first come into contact with outer layer 126. As the force of the impact is directed inward, central layer 128 acts to dissipate the shock from penetrating into or through inner layer 130. This advantageously eliminates the windshield from expelling shards of glass inward. Furthermore, because the impact point 118 is localized to outer layer 126, a repair can be made by injecting a clear adhesive resin under pressure which is then cured with ultraviolet light.

Referring to FIG. 10, an exploded perspective view is shown of the various layers of laminated windshield glass with light passing therethrough in accord with one possible embodiment of the present invention. Laminated glass is a type of safety glass which does not completely shatter into dangerous shards upon impact. Laminated glass is formed from two or more thin sheets of tempered glass that are fused to a rubber or plastic central layer, typically of polyvinyl butyral (PVB) or ethylene-vinyl acetate (EVA). The outer layers are independent, one on the outside of the vehicle and one on the inside of the vehicle. Outer layer 126 is distal inner layer 130 with central layer 128 sandwiched between. The central layer 128 acts by absorbing the shock from an impact and reduces the chance of breakage from small particles such as pebbles or the like forming impact points 118 or cracks 120.

If an object strikes the windshield glass with sufficient force, a chip or crack 120 may be formed. However, the impact point 118 is usually localized to only the outer layer 126 of the windshield 124. As described above, the inner layer 130 is located within the vehicle and is protected from breaking due to the central layer 128 acting as a central membrane absorbing the shock of the impact and thereby mitigating further damage to the inner layer 130 of glass. Windshield repair is a viable solution to repair the impact points or surface pits 118 that have damaged the outer layer 126 of the glass and prevent further damage such as cracks 120 spreading from the impact point 118 causing irreparable harm. When done properly, the strength and clarity is sufficiently restored for most safety related purposes.

As shown in FIG. 10, a path of light 132 is not impeded by any of the layers of glass. However, when debris or the like strikes a windshield, such as at relatively high speeds when driving, a surface pit 118 or crack 120 may be formed distorting and possibly distracting a driver. Additionally, such damage may also distort the path of light 132 decreasing a driver's ability to view the road, traffic, or other obstacles during transit. Therefore, it is paramount to seek a glass repair kit 100 which can alleviate any damage expediently while also being economical and user friendly.

In summary, during operation of one embodiment of the invention, UV shield 112 remains and backing 110 is removed. In another embodiment, UV shield 112 may also be removable. Housing 108 is positioned on the windshield with pocket 102 directly over the impact point 118. The housing is pressed and smoothed overall and around pocket 102 so that adhesive 114 seals around impact point 118 and opening 140. Once the housing has been pressed to make sure the adhesive is applied, then flexible pocket 102 can be pressed. This forces the resin out of porous material 104 into the cracks of the windshield to thereby prevent the cracks from continuing to run. The UV light will cure the resin with adequate time. In many cases, the resin will cure in a way that the cracks are no longer visible.

The glass repair kit may further comprise additional resin and an injector to inject the resin after removal of the housing as a touch up. Once injected, a piece of transparent tape or the like is placed over the crack wherein the additional resin will fill in any remaining cracks. The glass repair kit may further comprise a scraper to scrape any excess adhesive and resin to provide a smooth surface.

During manufacture of one embodiment, the glass repair kit construction may comprise providing a housing with an opening centrally located relative to the housing. A porous material comprising a resin may be placed within the opening and a film may be vacuum sealed relative to the top surface of the housing creating a pocket containing the porous material and the resin therein. An adhesive may be applied to the bottom surface of the housing and a backing adhered to the bottom surface sealing the porous material within from premature desiccation as well as from interacting with UV light. A UV shield may be provided and adhered to the top surface to block transmission of UV light from penetrating into the pocket to interact with the resin therein.

The foregoing description of the preferred embodiments of the invention has been presented for purposes of illustration and description only. It is not intended to be exhaustive or to limit the invention to the precise form disclosed; and obviously many modifications and variations are possible in light of the above teaching. While redundant, different methods discussed above could be utilized together if desired. Such modifications and variations that may be apparent to a person skilled in the art are intended to be included within the scope of this invention as defined by the accompanying claims.

In general overview of the drawings, it will be understood that such terms as "up," "down," "vertical," and the like, are made with reference to the drawings and/or the earth and that the devices may not be arranged in such positions at all times depending on variations in operation, transportation, mounting, and the like. As well, the drawings are intended to describe the concepts of the invention so that the presently preferred embodiments of the invention will be plainly disclosed to one of skill in the art but are not intended to be manufacturing level drawings or renditions of final products and may include highly simplified conceptual views and exaggerated angles, sizes, and the like, as desired for easier and quicker understanding or explanation of the invention.

One of skill in the art upon reviewing this specification will understand that the relative size, orientation, angular connection, and shape of the components may be greatly different from that shown to provide illuminating instruction in accord with the novel principals taught herein. As well, connectors, component shapes, and the like, between various housings and the like may be oriented or shaped differently or be of different types as desired. Many additional changes in the details, components, steps, and organization of the system and method, herein described and illustrated to explain the nature of the invention, may be made by those skilled in the art within the principle and scope of the invention. It is therefore understood that within the scope of the appended claims, the invention may be practiced otherwise than as specifically described.

The invention claimed is:

1. A glass repair kit to repair an impact point in safety glass, comprising:
   a housing, said housing comprising a top surface and a bottom surface whereby in operation after placement of said housing on said safety glass then said bottom surface is adjacent said safety glass and said top surface is distal said safety glass;
   an adhesive operable to adhere said bottom surface to said safety glass;
   a pocket formed in said housing for placement adjacent said safety glass to permit resin to flow from said pocket to said safety glass, said adhesive being positioned on said bottom surface entirely around said pocket whereby when said adhesive is adhered to said safety glass and said bottom surface then a seal is formed between said housing and said safety glass around said pocket, whereby compression of said pocket urges said resin into said impact point in said safety glass during operation of said glass repair kit, said resin being operable to flow into said impact point and cure in response to UV light; and
   a UV shield for said pocket, said UV shield being operable to block transmission of UV light to said resin within said pocket.

2. The glass repair kit of claim 1, further comprising said housing being bendable to conform to a shape of said safety glass, said adhesive forming a seal around an opening in said housing which connects between said housing and said safety glass.

3. The glass repair kit of claim 1, further comprising said UV shield being adhered to said top surface and being removable from said top surface of said housing, said UV shield being flexible, wherein when said UV shield is removed then said UV light is capable of transmission through said top surface of said housing and into said pocket.

4. The glass repair kit of claim 1, further comprising a backing being adhered to said bottom surface of said housing, said backing being operable to block transmission of said UV light to said pocket, said backing being removable from said bottom surface of said housing to expose said adhesive, said adhesive being operable to adhere to said safety glass after removal of said backing from said bottom surface.

5. The glass repair kit of claim 4, further comprising said bottom surface being substantially flat wherein after said backing is removed from said bottom surface said adhesive is operable to adhere to said safety glass to form an air tight seal therebetween.

6. The glass repair kit of claim 1, further comprising said housing comprises double sided tape wherein said adhesive being coated on top and bottom surfaces of said double sided tape, said adhesive is operable to adhere a backing to said bottom surface and further operable to secure said bottom surface to said safety glass.

7. The glass repair kit of claim 1, further comprising a porous material configured to be housed within said pocket wherein said porous material contains said resin within, said pocket being compressible, said porous material is also compressible, whereupon compression of said pocket said resin being operable to flow into said impact point of said safety glass.

8. The glass repair kit of claim 7, further comprising said porous material comprises a sponge.

9. The glass repair kit of claim 1, further comprising a capsule configured to be housed within said pocket wherein said capsule contains said resin within, said pocket is compressible, said capsule is also compressible wherein said capsule is breakable upon compression and said resin is operable to flow from said capsule and urged into said impact point of said safety glass.

10. The glass repair kit of claim 1, further comprising an opening centrally located in said housing, said opening on an opposite side relative to said pocket, said opening configured to allow flow of said resin therethrough.

11. The glass repair kit of claim 10, further comprising said housing comprising perforations along an area opposite said pocket, said perforations positioned to correspond relative said opening, said perforations being configured to open in response to compression of said pocket, whereby after said perforations are opened said resin is freed to flow through said perforations into said impact point of said safety glass.

12. The glass repair kit of claim 1, further comprising a backing secured to said housing, said backing being a UV shield, said backing being removable.

13. The glass repair kit of claim 1, further comprising that said pocket is compressible.

14. The glass repair kit of claim 1, further comprising a rigid compression member operable to compress said resin, said rigid compression member being in communication with said pocket upon compression, said rigid compression member operable to be mounted on said housing.

15. A glass repair kit to repair an impact point in safety glass, comprising:
   a housing, said housing comprising a top surface and a bottom surface whereby in operation after placement of said housing on said safety glass then said bottom surface is adjacent said safety glass and said top surface is distal said safety glass; a means to secure said bottom surface to said safety glass;
   a pocket comprising resin stored therein, said pocket being positioned to permit said resin to flow from said pocket to said safety glass, said means to secure being positioned on said bottom surface entirely around said pocket whereby when said means to secure is secured to said safety glass, whereby compression of said pocket urges said resin into said impact point in said safety glass during operation of said glass repair kit, said resin being operable to flow into said impact point and cure in response to UV light; and
   a UV shield for said pocket, said UV shield being operable to block transmission of UV light to said resin within said pocket.

16. The glass repair kit of claim 15, further comprising a means to seal said bottom surface and said safety glass to form a fluid seal around at least said pocket.

17. The glass repair kit of claim 15, further comprising that said pocket is compressible.

18. A glass repair kit to repair an impact point in safety glass, comprising:
   a housing, said housing comprising a top surface and a bottom surface whereby in operation after placement of said housing on said safety glass then said bottom surface is adjacent said safety glass and said top surface is distal said safety glass;
   an adhesive operable to adhere said bottom surface to said safety glass;
   resin in said housing that is flowable to said safety glass, said adhesive being positioned on said bottom surface whereby when said adhesive is adhered to said safety glass and said bottom surface then a seal is formed between said housing and said safety glass, whereby compression urges said resin into said impact point in said safety glass during operation of said glass repair kit, said resin being operable to flow into said impact point and cure in response to UV light; and
   a UV shield, said UV shield being operable to block transmission of UV light to said resin.

19. The glass repair kit of claim 18, further comprising a capsule operable to be placed within said housing wherein said capsule contains said resin within, wherein said capsule is breakable upon compression and said resin is operable to flow from said capsule into said impact point of said safety glass.

20. The glass repair kit of claim 18, further comprising a chamber within said housing, said chamber defined by said housing wherein said chamber is operable to retain said resin within.

21. The glass repair kit of claim 18, further comprising a rigid member mounted to compress said resin, whereupon compression of said rigid member then said resin is urged from said housing into said impact point.

* * * * *